United States Patent
Zsolt et al.

(10) Patent No.: US 8,424,408 B2
(45) Date of Patent: Apr. 23, 2013

(54) GEARING OF A GEARWHEEL

(75) Inventors: Roth Zsolt, Heidenheim (DE); Etzold Mathias, Kossa OT Pressel (DE)

(73) Assignee: Voith Patent GmbH, Heindenheim (DE)

( * ) Notice: Subject to any disclaimer, the term of this patent is extended or adjusted under 35 U.S.C. 154(b) by 410 days.

(21) Appl. No.: 12/733,386

(22) PCT Filed: Jul. 21, 2009

(86) PCT No.: PCT/EP2009/005270
§ 371 (c)(1),
(2), (4) Date: Jun. 8, 2010

(87) PCT Pub. No.: WO2010/025791
PCT Pub. Date: Mar. 11, 2010

(65) Prior Publication Data
US 2011/0113911 A1   May 19, 2011

(30) Foreign Application Priority Data
Sep. 2, 2008 (DE) .......................... 10 2008 045 318

(51) Int. Cl.
F16H 55/08 (2006.01)
F16H 55/10 (2006.01)
F16H 55/17 (2006.01)

(52) U.S. Cl.
USPC ............................................. 74/457; 74/462

(58) Field of Classification Search ............ 74/457, 74/460, 462
See application file for complete search history.

(56) References Cited

U.S. PATENT DOCUMENTS

| 4,108,017 | A | * | 8/1978 | Rouverol | 74/462 |
| 4,589,300 | A | * | 5/1986 | Rouverol | 74/462 |
| 4,644,814 | A | * | 2/1987 | Rouverol | 74/462 |
| 4,651,588 | A | * | 3/1987 | Rouverol | 74/462 |
| 6,342,023 | B1 | | 1/2002 | Willmot | |
| 7,926,381 | B2 | * | 4/2011 | Grosskopf et al. | 74/462 |
| 8,051,738 | B2 | * | 11/2011 | Brust et al. | 74/462 |
| 8,132,480 | B2 | * | 3/2012 | Allen et al. | 74/462 |
| 2002/0134184 | A1 | * | 9/2002 | Hawkins | 74/457 |
| 2009/0165585 | A1 | * | 7/2009 | Zhuravlev | 74/462 |
| 2010/0132496 | A1 | * | 6/2010 | Okamoto | 74/457 |

FOREIGN PATENT DOCUMENTS

| DE | 19501016 A1 | 7/1996 |
| DE | 102006015521 B3 | 4/2007 |
| WO | WO 2006/038901 | 4/2006 |
| WO | WO 2007008096 A1 * | 1/2007 |

* cited by examiner

Primary Examiner — Justin Krause
(74) Attorney, Agent, or Firm — Farjami & Farjami LLP

(57) ABSTRACT

The invention relates to the gearing of a gearwheel having a plurality of teeth. The gearwheel has a useful area and a base area of the particular tooth flank form. Viewed in normal section, the tooth base area extends from a base circle up to a useful circle. The tooth flanks of adjacent teeth in normal section are each implemented as symmetrical to one another, the axis of symmetry intersecting the base circle in the base point. According to the invention, the tooth flanks are implemented in the tooth base area as a tangent function from a relevant diameter. The tangent function merges at the relevant diameter in a constant tangent into the tooth flank form of the useful area. The tangent function merges in the tooth base area in a constant tangent into an orbit, which is tangentially applied in the base point to the base circle. Significant increases of the tooth base strength may thus be achieved.

20 Claims, 2 Drawing Sheets

GEARING OF A GEARWHEEL

This is a U.S. national phase application which is based on, and claims priority from, PCT application Serial No. PCT/EP2009/005270, filed on Jul. 21, 2009, which claims priority from foreign application Serial No. 10 2008 045 318.8, filed on Sep. 2, 2008 in Germany.

The invention relates to the gearing of a gearwheel having a plurality of teeth, according to the type defined in greater detail in the preamble of claim 1.

A gearing of an evolvent rolled-gearing gearwheel is known from DE 10 2006 015 521 B3. The core of the cited publication concerns itself in particular with the so-called tooth base area, i.e., the area which connects the individual teeth of the evolvent rolled-gearing gearwheel to one another. In the cited publication, with the goal of providing gearing capable of running uniformly in both running directions, a tooth base area is proposed which is rounded in the form of an ellipse in relation to the remaining hobbed rounding. Such gearwheels have a higher carrying capacity than gearwheels having radial rounding due to the elliptical rounding of the tooth base area.

Proceeding from this previously known prior art, it is the object of the present invention to provide a gearing for a rolled-gearing gearwheel, which allows a further increase of the strength in the tooth base area, so that the gearwheel can be implemented with the same strength at smaller overall size or with a significant increase of the strength at comparable overall size.

This object is achieved according to the invention by the features cited in the characterizing part of claim 1.

The inventor has surprisingly found that a design of the tooth base area having a tangent function, which originates in a constant tangent from the tooth flank form of the useful area lying above, and which in turn merges in a constant tangent into an orbit, which is again applied tangentially to the base circle of the gearwheel, allows a significant increase of the tooth base strength.

The experiments performed by the inventor have shown that computed strength increases of the tooth base of up to 30%, in relation to a typical rolled-gearing gearwheel, are possible through this insertion of a tangent function between the orbit and the tooth flank form in the useful area.

Because of the symmetry of the tooth flanks of two adjacent teeth to one another, it is sufficient to ascertain one of the tooth flank forms and then transfer it by a reflection at the axis of symmetry to the opposing area. Because the orbit in the base point is applied tangentially to the base circle and the axis of symmetry runs through this base point, using a simple combination of a tangent function with the circular orbit up to the base point and then a reflection of these two functions, the entire tooth base area can thus be designed to increase its strength.

These functionalities may each be ascertained easily and efficiently on the normal section in the cited way, because the transitions of the functions into one another may be mathematically represented, so that only one angle and the radius of the orbit are to be selected by the design conditions. The form of the tooth base area and/or the tooth gaps of the gearwheel thus arising can be transferred onto the normal section of various teeth in gearwheels. Thus, for example, linear, inclined, or curved front gearings are just as suitable for the design according to the invention of the tooth base area and the increase of the strength connected thereto as the gearings of bevel gears or other types of gearwheels, for example.

Fundamentally, the design of the tooth base according to the invention is, of course, also conceivable for racks, bevel gears, beveloid gears, crown wheels, helical gears, or worm wheels, the tooth base form being determined in the particular normal section and, for example, in single-pitch and multiple pitch worm wheels, then changing correspondingly over the length of the tooth, which is unwound as a whole, of course, because of the typically changing geometry of the tooth itself, i.e., the tooth height and the tooth width, for example.

A gearing according to the invention is thus fundamentally to be implemented in various gearwheels and in elements provided with teeth. The combination with arbitrary tooth flank forms in the useful area is also conceivable.

However, the use with a tooth flank form implemented in the useful area as a rolling curve (evolvent or octoid), in particular an evolvent tooth flank form, is particularly preferred. This common type of a gearing, which is generally typical in mechanical engineering, is particularly well suitable for the implementation of the tooth base area according to the invention. The greatest strength increases through the novel design of the tooth base area have been ascertained in evolvent toothed gearwheels of this type.

The appearance and the functionality of the novel tooth base form is described hereafter, on the example of an evolvent toothed gearwheel on a tooth and/or a tooth gap in normal section, on the basis of the figures in an exemplary embodiment. This implementation of the tooth base area, as already described in detail, can fundamentally also be applied to various types of gearwheels and gearings, however.

Figure 1:
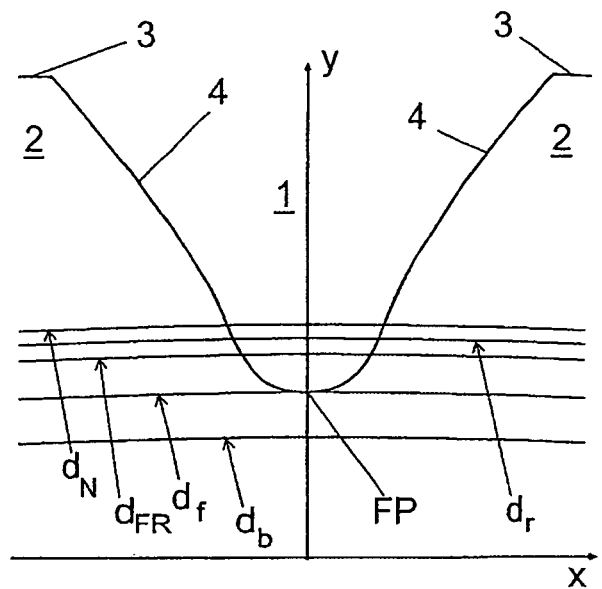
FIG. 1 shows the view in normal section of an evolvent toothed gearwheel having a frontal gearing.

A tooth gap 1 is shown in a normal section in FIG. 1. The coordinates x, y are noted as reference variables, the y axis simultaneously being the axis of symmetry of the tooth gap 1. The indicated sections of the two teeth 2 are restricted in their head area 3 by a head circle (not shown here). The tooth flank form 4 selected as an example here is an evolvent tooth flank form, which is used up to a diameter $d_N$ of the so-called useful circle of the tooth flank of the tooth (not shown here) of a counter gearwheel or toothed element meshing with this gearwheel. This section between the head circle in the area of the heads 3 of the teeth 2 and the useful circle $d_N$ is designated hereafter as the useful area. In addition, the lowest diameter is also to be noted, up to which a tooth of a counter gearwheel or toothed element meshing with this gearwheel plunges into the tooth gap. This diameter is typically designated as the free circle diameter $d_{FR}$.

The adjoining area in the direction of the gearwheel center between the useful circle $d_N$ and the lowest point of the tooth gap 1, in which the so-called base circle $d_f$ lies, is designated hereafter as the base area of the tooth gap 1. The point of intersection of the axis of symmetry y with the base circle $d_f$ is the base point FP of the tooth gap 1.

The variables designated up to this point are common and typical variables in all gearwheels, on which the following description in greater detail of the implementation of the tooth base area according to the invention, which is already shown here in the way according to the invention, is supported.

In addition, in the example shown here of the evolvent tooth flank form 4, further variables are significant. Thus, in FIG. 1 the so-called main circle $d_b$ is shown, which is relevant for the design of the flank form 4 of the evolvent gearing. In addition, the module m which is generally useful in gearings is to be noted briefly, which results from the pitch circle diameter (not shown here) divided by the tooth count and/or the pitch p divided by the number $\pi$.

In addition, the diameter or radius can be seen in FIG. 1, which is relevant for the invention and is to be designated as the relevant diameter $d_r$. This relevant diameter $d_r$ describes the transition of the tooth flank form 4 into the useful area in the tooth flank form according to the invention in the base area in the exemplary embodiment shown here. This transition is also known as the form circle in typical gearings. The relevant diameter can theoretically be equal to the diameter of the useful circle $d_N$. In general, however, it is selected as somewhat smaller, in order to ensure reasonable reliability in regard to the manufacturing tolerance and the mounting tolerance of the gearwheels. In the exemplary embodiment shown here, the relevant diameter $d_r$ is selected from the arithmetic mean between the useful circle diameter $d_N$ and the free circle diameter $d_{FR}$, so that a certain safety interval results between the relevant diameter $d_r$ and the useful circle diameter $d_N$. It is thus ensured that a tooth (not shown here) of a counter toothed element meshing with the gearwheel runs in every case on the calculated form of the tooth flank 4, i.e., the evolvent here, and does not engage by coming to bear on the form implemented according to the invention of the flank in the tooth base area.

Figure 2:
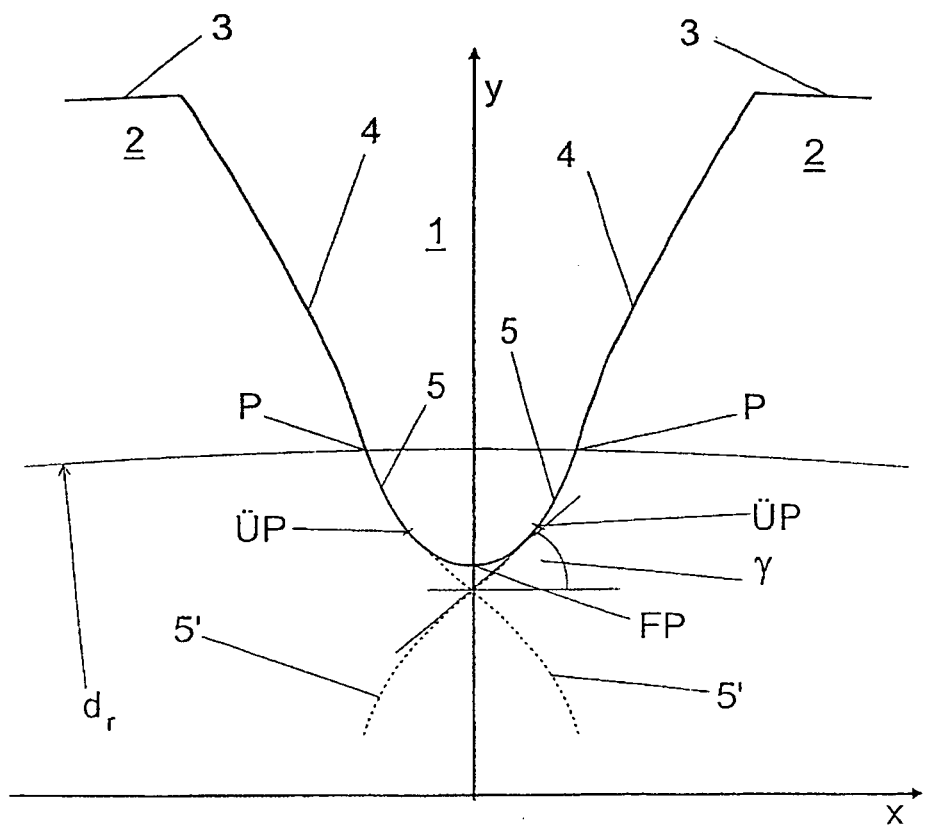
FIG. 2 shows the implementation of the tooth base area in a gearwheel according to FIG. 1 similarly to the invention.

The form of the tooth base in the implementation according to the invention is explained in greater detail in FIG. 2. The elements already noted in FIG. 1 are also provided with the same reference numerals in FIG. 2. Of the diameters explained in FIG. 1, only the relevant diameter $d_r$ is still shown in FIG. 2. As already noted, the tooth flank form 4 of the useful area in the present exemplary embodiment merges, for safety and tolerance reasons, in a constant tangent in the area of the relevant diameter $d_r$ into the implementation according to the invention of the tooth base form in the tooth base area. At the point P, at which the diameter $d_r$ intersects the tooth flank 4, this transition from the evolvent tooth flank form 4 into a tangent function occurs in the area of the tooth flank form designated by 5. In FIG. 2, the tangent running in the area 5 of the tooth flank form is lengthened in the direction of the gearwheel center point, i.e., the origin of the coordinates. This section of the tangent function 5' intersects the y axis in an area below the base point FP. In this point of intersection with the y axis, i.e., upon the mathematical condition x=0, the tangent has a corresponding pitch angle in the section with the axis of symmetry y. The pitch angle in relation to the x axis is designated in FIG. 2 as the angle $\gamma$. In relation to the axis of symmetry y itself, an angle of 90°−$\gamma$ thus results. This angle $\gamma$ will be significant for the design explained in greater detail hereafter and/or the selection of the concrete tangent function.

In addition, it can be seen that the tangent function merges into an orbit 6 at a transition point ÜP. This transition is also implemented in a constant tangent between the orbit 6 and the used area of the tangent 5. The orbit 6 is thus applied tangentially to the base circle $d_f$ in the base point FP, i.e., the point of intersection of the base circle $d_f$ with the axis of symmetry y.

The mathematical function of the tangent in relation to the coordinate center point in the center of the gearwheel and a particular axis of symmetry y running symmetrically to the particular tooth gap 1 is described on the basis of the following equation:

$$y(x) = a \cdot \tan(b \cdot x) + c \qquad \text{(Equation 1)}$$

Three boundary conditions are required in order to determine this function uniquely, which are established as follows:
(1) The transition from the evolvent to tangent function is a constant tangent.
(2) The pitch angle of the tangent function at the point of intersection with the axis of symmetry y (i.e., at x=0) is established by the angle $\gamma$. This angle can be selected freely later within certain design boundaries, which will be explained in greater detail hereafter.
(3) The transition point from the evolvent to the tangent function is located on the relevant diameter $d_r$, which can be fundamentally selected arbitrarily, but should be smaller than the useful circle diameter $d_N$ in any case, as already described above.

The orbit 6 adjoining this tangent results in a general form according to the following equation:

$$r^2 = (x-e)^2 + (y-f)^2 \qquad \text{(Equation 2)}$$

The radius r can be selected arbitrarily. The center point is to lie on the axis of symmetry y, i.e., the ordinate of the coordinate system. The value e thus results as e=0. In addition, the following further boundary condition is required for the circle equation:
(4) The transition at the transition point ÜP to the tangent function is a constant tangent.

Figure 3:
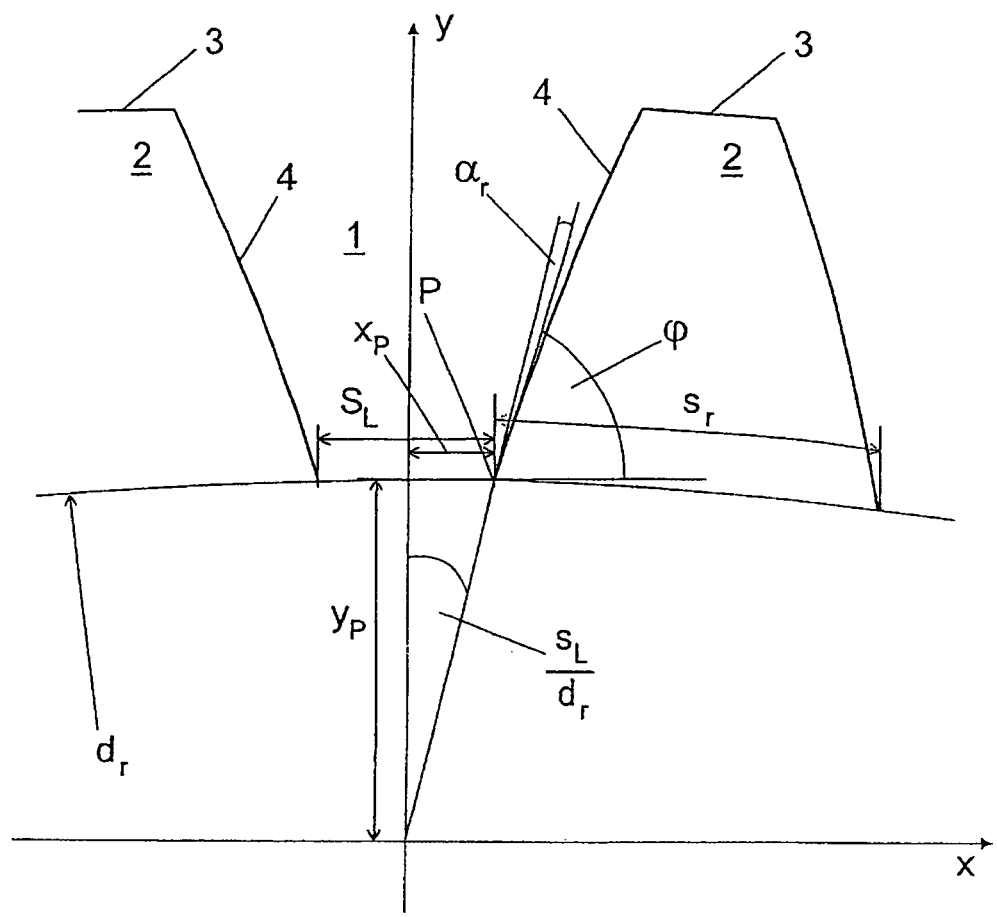
FIG. 3 shows a detailed illustration of the mathematical variables to ascertain the required functions for the implementation of the tooth base area according to the invention.

The tooth flank form in the base area is mathematically described generally hereafter, the relevant variables resulting from FIG. 3, if they were not already described by the prior figures. Firstly, the coordinates of the connection point P of the evolvent are determined.

This point lies on the diameter $d_r$. In order to determine the tooth gap width $S_L$ (chord), the tooth thickness $s_r$ in radian measure is required, which is determined as follows (with s=tooth thickness on the pitch circle; d=pitch circle diameter):

$$s_r = d_r \left( \frac{s}{d} + \mathrm{inv}\alpha - \mathrm{inv}\alpha_r \right) \qquad \text{(Equation 3)}$$

$\alpha_r$ is the engagement angle on the diameter $d_r$. The engagement angle $\alpha_r$ is implicitly also predefined via the selection of the evolvent. It has been shown that the increase of the strength according to the invention occurs from an engagement angle $\alpha_r$ of 4° to 5°. The engagement angle $\alpha_r$ is to be selected as greater than 4°, preferably greater than 7° in any case. In contrast, $\alpha$ designates the engagement angle on the pitch circle, which is typically at 15-25°, preferably 20° in most gearwheels.

The tooth gap width $S_L$ in radian measure then results as:

$$s_L = \pi \cdot \frac{d_r}{z} - s_r \qquad \text{(Equation 4)}$$

The distance of the tooth gap width (chord) can be calculated therefrom:

$$S_L = d_r \cdot \sin \frac{s_L}{d_r} \qquad \text{(Equation 5)}$$

The x coordinate of the point P thus reads:

$$x_P = \frac{1}{2} S_L \quad \text{(Equation 6)}$$

The y coordinate results according to the Pythagorean theorem as:

$$y_P = \sqrt{\left(\frac{d_r}{2}\right)^2 - \left(\frac{S_L}{2}\right)^2} \quad \text{(Equation 7)}$$

In order to ensure the tangent is constant at the point P, knowing the gradient angle φ of the evolvent in the point P is necessary. This angle is composed of the engagement angle $\alpha_r$ and half of the opening angle of the tooth gap:

$$\varphi = \frac{\pi}{2} - \left(\alpha_r + \frac{S_L}{d_r}\right) \quad \text{(Equation 8)}$$

The coefficients a and b and the summand c may be determined using the boundary conditions. It follows from boundary condition (1) that:

$$y'\left(x = \frac{S_L}{2}\right) = \tan\varphi \quad \text{(Equation 9)}$$

It follows from boundary condition (2) that:

$$y'(x=0) = \tan\gamma \quad \text{(Equation 10)}$$

It follows from boundary condition (3) that:

$$y\left(x = \frac{S_L}{2}\right) = \sqrt{\left(\frac{d_r}{2}\right)^2 - \left(\frac{S_L}{2}\right)^2} \quad \text{(Equation 11)}$$

It thus results for a, b, and c that:

$$a = \frac{S_L}{2} \cdot \frac{\tan\gamma}{\arccos\sqrt{\frac{\tan\gamma}{\tan\varphi}}} \quad \text{(Equation 12)}$$

$$b = \frac{2}{S_L} \cdot \arccos\sqrt{\frac{\tan\gamma}{\tan\varphi}} \quad \text{(Equation 13)}$$

$$c = \sqrt{\left(\frac{d_r}{2}\right)^2 - \left(\frac{S_L}{2}\right)^2} - a \cdot \tan\left(b \cdot \frac{S_L}{2}\right) \quad \text{(Equation 14)}$$

The angle γ can be selected accordingly. In order to achieve an improvement relative to typical gearings, it is to be selected as less than 65° in any case. However, in a first approximation, the optimum value is at or below 45°. Selecting the angle according to the following relationship of equation 15 has proven to be particularly preferred, good results being achieved in a tolerance range of +/−20% around this γ value.

$$\gamma = 45° - \frac{180°}{z} - \alpha_r \quad \text{(Equation 15)}$$

The general circle equation must firstly be put into the form g(x).

$$g(x) = \pm\sqrt{r^2 - (x-e)^2} + f \quad \text{(Equation 16)}$$

Because the center point of the circle lies on the y axis, e can be set to e=0. The lower circular arc is required, the sign of the root must thus be negative. Therefore:

$$g(x) = -\sqrt{r^2 - x^2} + f \quad \text{(Equation 17)}$$

The determination of d can now be performed. The following relationship results from boundary condition (4). The derivatives of the tangent function and the circular function must be of equal size at the transition location in the transition point ÜP at $x_{\ddot{U}}$.

$$g'(x_{\ddot{U}}) = y'(x_{\ddot{U}}) \quad \text{(Equation 18)}$$

An equation results therefrom, using which the transition location $x_{\ddot{U}}$ can be numerically determined:

$$0 = \frac{\cos^4(b \cdot x_{\ddot{U}})}{(a \cdot b)^2} - \frac{r^2}{x_{\ddot{U}}^2} + 1 \quad \text{(Equation 19)}$$

The summand f can now be determined using $x_{\ddot{U}}$. For this purpose, the two functions are set equal at the location $x_{\ddot{U}}$.

$$a \cdot \tan(b \cdot x_{\ddot{U}}) + c = -\sqrt{r^2 - x_{\ddot{U}}^2} + f \quad \text{(Equation 20)}$$

Finally, the following equation results for f:

$$f = a \cdot \tan(b \cdot x_{\ddot{U}}) + c + \sqrt{r^2 - x_{\ddot{U}}^2} \quad \text{(Equation 21)}$$

The geometry of the tooth gap can thus be generally expressed in the tooth base area as follows:

| x range | function |
| --- | --- |
| $-\frac{S_L}{2} \leq x \leq -x_{\ddot{U}}$ | $y(x) = a \cdot \tan(-b \cdot x) + c$ |
| $-x_{\ddot{U}} < x < x_{\ddot{U}}$ | $g(x) = -\sqrt{r^2 - x^2} + f$ |
| $x_{\ddot{U}} \leq x \leq \frac{S_L}{2}$ | $y(x) = a \cdot \tan(b \cdot x) + c$ | with:
 a according to equation 12
 b according to equation 13
 c according to equation 14
 d according to equation 21
 $x_{\ddot{U}}$ according to equation 19

The function for the negative arguments is simply obtained in this case by a reflection at the ordinate, because this ordinate is simultaneously the axis of symmetry y of the tooth gap 1.

As results from the mathematical relationship explained in detail above, only the angle γ and the radius r of the orbit 6 are to be selected by the designer of a tooth base form of this type. For the ideal selection of the angle γ, a corresponding recommendation is already provided above with equation 15.

Values which lie in the range of 0.1-0.6 times the module m have been shown to be suitable for the radius r of the orbit 6. These values are preferably in the range of 0.3-0.4 times the module m. A further improvement may be achieved if one relates to the distance of the tooth gap width $S_L$ as a chord. Values in the range of 0.1-0.6 times the tooth gap width $S_L$ have proven to be suitable for the radius r. These values are preferably in the range of 0.3-0.4 times the tooth gap width $S_L$. In the following example, calculations were performed on the basis of a radius of $r=0.3*S_L$, this value is to be selected if possible as a particularly preferred value.

On the basis of these values, FEM calculations resulted in an increase of the tooth base strength of up to 30% relative to typical tooth base forms.

An example on the basis of values which were selected for exemplary purposes from the cited value ranges is explained hereafter. The selected designations and symbols are those which are generally typical and recognized in gearwheels.

A gearwheel I has the following characteristic variables:

| | |
|---|---|
| module | m = 4 mm |
| tooth count | $z_1$ = 53 |
| profile shift | $x_1$ = 0 |
| engagement angle on the pitch circle | α = 20°. |

In order to determine the useful circle diameter $d_N$ and the free circle diameter $d_{FR}$ of the gearwheel I, the characteristic variables of a second gearwheel II meshing with gearwheel I and the axial spacing between the gearwheels I, II are needed.

| | |
|---|---|
| tooth count | $z_2$ = 19 |
| profile shift | $x_2$ = 0.6 |
| axial spacing | a = 146.4 mm |

For comparison, a hobbed gearwheel variant is used. The base form is generated using a hobber having the following characteristic values:

| | |
|---|---|
| head height factor | $h_{aP0}^*$ = 1.3889 |
| head rounding factor | $\rho_{aP0}^*$ = 0.25 |
| protuberance angle | $\alpha_{prn0}$ = 10° |
| protuberance amount | $p_{rn0}$ = 0.26 mm |

(as typical and each related to the module m, as indicated by the *)

The machining allowance before the grinding is selected as q=0.16 mm, a residual protuberance amount of 0.1 mm correspondingly results.

The following input variables result for this gearing for the calculation of the base curve:

| | |
|---|---|
| useful circle diameter | $d_{N1}$ = 207.764 mm |
| free circle diameter | $d_{FR}$ = 204.000 mm |
| Diameter of the transition evolvent-tangent function (arithmetic mean of $d_{N1}$ and $d_{FR}$): | $d_r$ = 205.8 mm |
| tooth gap width (chord) on $d_r$ | $S_L$ = 4.204 mm |
| engagement angle $\alpha_r$ on the relevant diameter $d_r$: | $\alpha_r$ = 14.6° |
| gradient angle of the evolvent at the point of the transition evolvent-tangent function: | $\phi$ = 74.2° |

In order to uniquely determine the base curve, the specifications for the gradient angle of the tangent function at the location $x=0(\gamma)$ and the radius r are still needed. The following relationship can be assumed for the angle γ according to equation 15:

$$\gamma = 45° - \frac{180°}{z_1} - \alpha_r$$

The rounding radius r of the orbit 6 is ideal if—as described above—the following relationship applies:

$$r=0.35*S_L$$

For the example, it thus results that:
γ=27°
r=1.5 mm

The coefficients and summands of the tangent and the circular function result here as:

| | |
|---|---|
| factor | a = 0.30626; |
| factor | b = 0.63469976 |
| summand | c = 101.64979; and |
| summand | f = 103.32733 |

The limits for γ are at the following values in this gearwheel:
$\gamma_{min}$=11°
$\gamma_{max}$=65°

If one leaves this range, the novel tooth base form does not represent a strain minimization and thus does not represent an increase of the tooth base strength in relation to the variant generated using the above-mentioned hobber.

The lower limit for the radius is $r_{min}$=0.5 mm, and the upper limit is $r_{max}$=2.1 mm in this example. This is not a limit in regard to strain, but rather a geometrical limit. This radius is approximately full rounding, which still has lower strains than the hobbed comparison variant, however, but higher than for optimum y and r.

An increase of the tooth base strength of up to 30% in relation to the typical hobbed gearwheel is possible with the gearwheel I calculated for exemplary purposes here.

The production of such gearwheels can be performed, for example, by milling units which are freely mobile and freely programmable in multiple axes or by suitable hobbers derived from the tooth base form according to the invention.

The invention claimed is:

1. A gearing of a gearwheel having a plurality of teeth; wherein:
   the plurality of teeth include tooth flanks having a useful area and a tooth base area;
   the tooth base area extending, viewed in normal section, from a base circle up to a useful circle;
   the tooth flanks of teeth which are adjacent in normal section each being implemented symmetrically to one another,
   the axis of symmetry (y) intersecting the base circle in the base point;
   characterized in that
   the tooth flanks in the tooth base area are implemented as a tangent function from a relevant diameter ($d_r$) in the direction of the gearwheel center point;
   the tangent function merges in the relevant diameter ($d_r$) in a constant tangent into the tooth flank form of the useful area;

the tangent function merges in the tooth base area in a constant tangent into an orbit, which is tangentially applied to the base circle ($d_f$) in the base point (FP).

2. The gearing according to claim 1, wherein:
the tangent function lengthened beyond the orbit intersects the axis of symmetry (y) at a pitch angle of 90°−γ;
γ being selected as less than 65°.

3. The gearing according to claim 2, wherein γ is selected as a function of the tooth count (z) and the engagement angle ($α_r$) of the tooth flank form at the relevant diameter ($d_r$) by the relationship 45°−180°/z−$α_r$.

4. The gearing according to claim 3, wherein the engagement angle ($α_r$) of the tooth flank form at the relevant diameter ($d_r$) is selected as greater than or equal to 4°, in particular greater than 7°.

5. The gearing according to claim 2, wherein the relevant diameter ($d_r$) is selected as the arithmetic mean value between the diameter of the useful circle and the diameter of a free circle.

6. The gearing according to claim 2, wherein the tooth flank form is implemented in the useful area as an evolvent.

7. The gearing according to claim 1, wherein:
the tangent function lengthened beyond the orbit intersects the axis of symmetry (y) at a pitch angle of 90°−γ;
γ being selected as less than 50°.

8. The gearing according to claim 7, wherein the relevant diameter ($d_r$) is selected as the arithmetic mean value between the diameter of the useful circle and the diameter of a free circle.

9. The gearing according to claim 7, wherein the tooth flank form is implemented in the useful area as an evolvent.

10. The gearing according to claim 1, wherein:
the tangent function lengthened beyond the orbit intersects the axis of symmetry (y) at a pitch angle of 90°−γ;
γ being selected as less than 45°.

11. The gearing according to claim 10, wherein the relevant diameter ($d_r$) is selected as the arithmetic mean value between the diameter of the useful circle and the diameter of a free circle.

12. The gearing according to claim 10, wherein the tooth flank form is implemented in the useful area as an evolvent.

13. The gearing according to claim 1, wherein the radius of the orbit is selected as 0.1-0.6 times the module.

14. The gearing according to claim 1, wherein the radius of the orbit is selected as 0.3-0.4 times the module.

15. The gearing according to claim 1, wherein the radius of the orbit is selected as 0.1-0.6 times the tooth gap width ($S_L$) at the relevant diameter ($d_r$).

16. The gearing according to claim 1, wherein the radius of the orbit is selected as 0.3-0.4 times the tooth gap width ($S_L$) at the relevant diameter ($d_r$).

17. The gearing according to claim 1, wherein the relevant diameter ($d_r$) is less than or at most equal to the diameter of the useful circle.

18. The gearing according to claim 1, wherein the relevant diameter ($d_r$) is selected as the arithmetic mean value between the diameter of the useful circle and the diameter of a free circle.

19. The gearing according to claim 1, wherein the tooth flank form is implemented in the useful area as an evolvent.

20. The gearing according to claim 19, wherein the relevant diameter ($d_r$) is selected as greater than or at least equal to the diameter of the main circle.

* * * * *